Sept. 18, 1945.  F. W. SCHWINN  2,384,968
TRUSS BRACKET
Filed Nov. 19, 1943   2 Sheets-Sheet 1
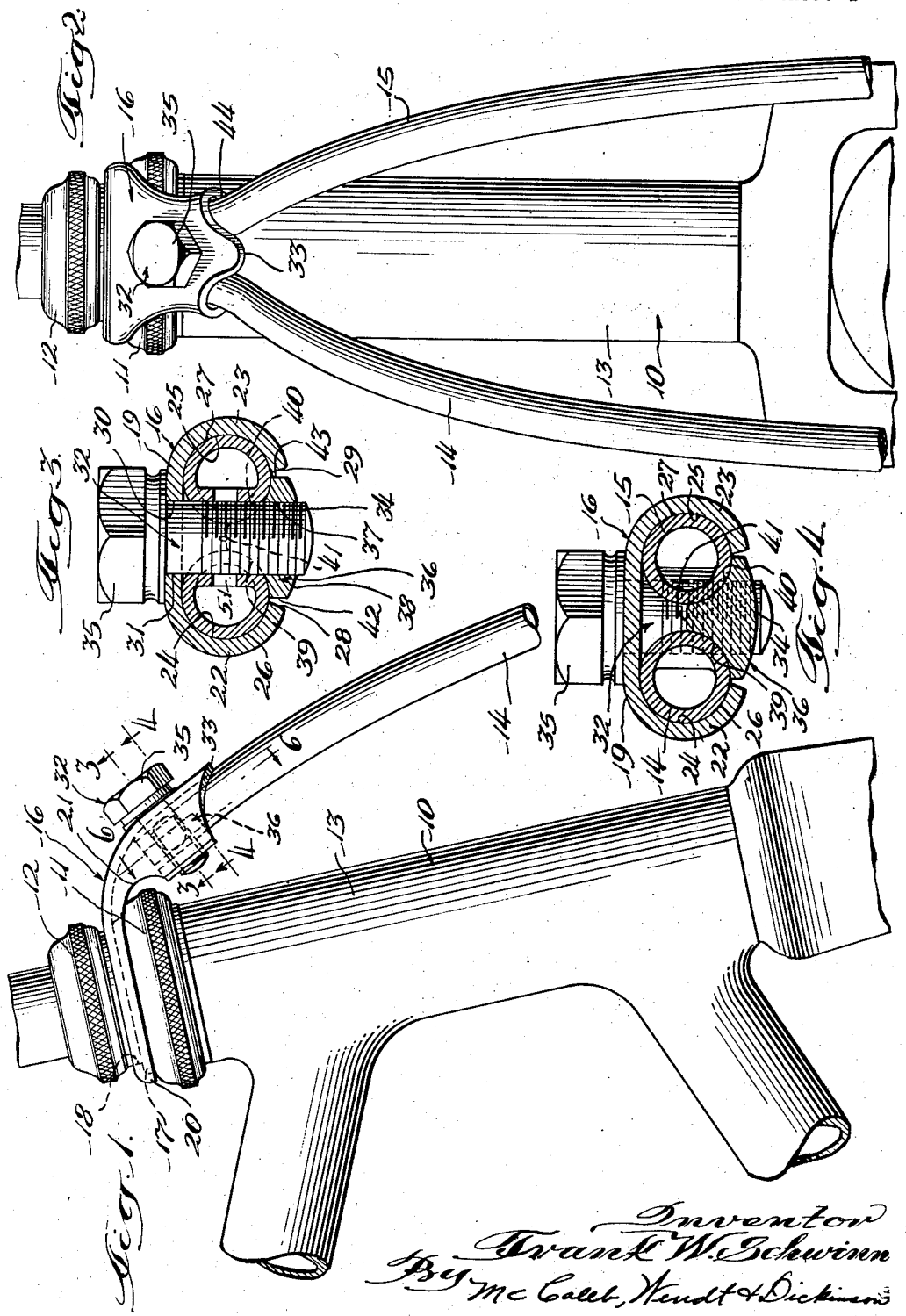

Sept. 18, 1945.  F. W. SCHWINN  2,384,968
TRUSS BRACKET
Filed Nov. 19, 1943  2 Sheets-Sheet 2
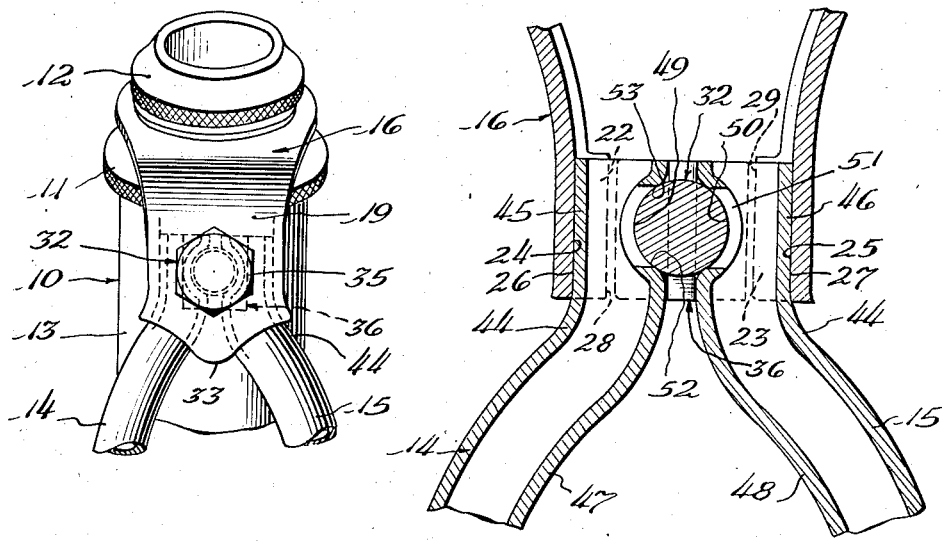
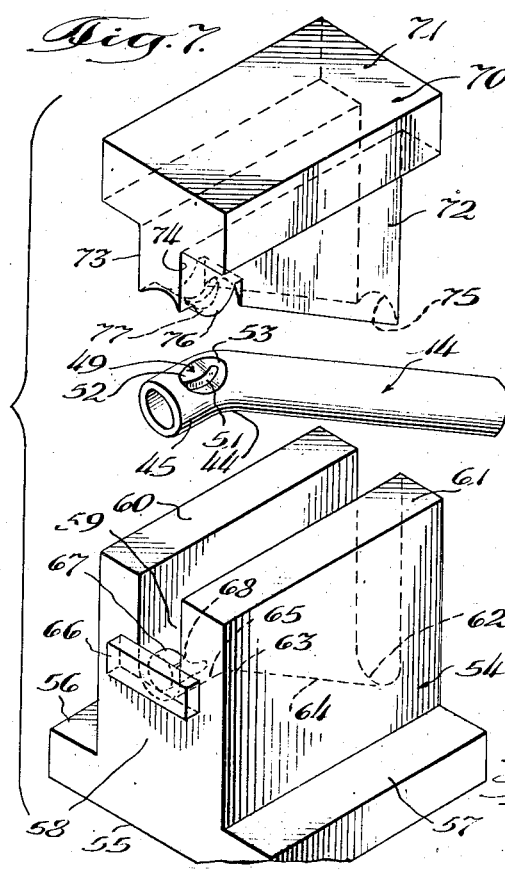
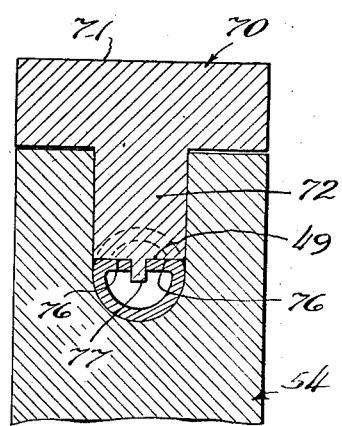
Inventor
Frank W. Schwinn
By McCaleb, Hendt & Dickinson
Attorneys Patented Sept. 18, 1945

2,384,968

UNITED STATES PATENT OFFICE 2,384,968

TRUSS BRACKET

Frank W. Schwinn, Chicago, Ill.

Application November 19, 1943, Serial No. 510,876

9 Claims. (Cl. 287—54)

The present invention relates to truss brackets for securing the truss tubes which are used on a bicycle for reenforcing the front fork.

One of the objects of the invention is the provision of an improved bracket for securing the truss tubes that reenforce the front fork of a bicycle, to the steering column tube, in which the truss tubes are more securely mounted than in the devices of the prior art and which is adapted to be manufactured with less expense than those devices.

Another object of the invention is the provision of an improved bicycle front fork truss construction, particularly at the upper end thereof, by means of which a more durable and sturdy structure is provided and by means of which the truss tubes and bracket are adapted to be secured together rigidly with a single screw bolt.

Another object of the invention is the provision of an improved truss tube bracket structure which is simple, sturdy, capable of economical manufacture, and which lends itself to manufacture by stamping or punching operations so as to reduce to a minimum the machine operations which are usually necessary in making such device.

Another object of the invention is the provision of an improved method of making truss tubes for use with the improved bracket and improved tools to be used in the making of the truss tubes embodying the invention.

Other objects and advantages of the invention will be apparent from the following description and the accompanying drawings in which similar characters of reference indicate similar parts throughout the several views.

Referring to the drawings, of which there are two sheets,

Figure 1 is a fragmentary side elevational view of a bicycle construction at the steering post tube and truss, embodying the invention;

Fig. 2 is a fragmentary front elevational view of the same structure;

Fig. 3 is a transverse sectional view taken on the plane of the line 3—3 of Fig. 1 looking in the direction of the arrows;

Fig. 4 is a similar sectional view taken on the plane of the line 4—4 of Fig. 1 looking in the direction of the arrows;

Fig. 5 is a view in perspective, taken from the top and front of the truss tube bracket, showing the mode of securement of the truss tubes and the bracket;

Fig. 6 is a fragmentary sectional view taken on the plane of the line 6—6 of Fig. 1, looking in the direction of the arrows;

Fig. 7 is an exploded view showing the truss tube between the punch and die which are adapted to be used in carrying out the new method of forming truss tubes; and Fig. 8 is a vertical sectional view taken through the punch, tube and die when the punch has reached the end of its stroke.

Referring to Fig. 1, 10 indicates in its entirety the bicycle frame, of which only such parts are shown as cooperate with the new truss tube bracket that forms the subject of the present invention. This truss tube bracket is usually secured between the head adjusting cup 11 and lock nut 12 on the steering column tube 13 of a bicycle.

The truss tube bracket is shown in connection with a pair of truss tubes 14, 15, the upper ends of which are secured to the head adjusting cup by means of the bracket 16. The head adjusting cup is preferably provided with an upwardly extending tubular portion 17 of reduced diameter and the bracket 16 is preferably provided with a circular bore 18 adapted to pass this portion of reduced size of the head adjusting cup.

Surrounding the bore 18 the bracket 16 may be circular but it is provided with a forwardly and downwardly extending securing flange 19 that is adapted to be secured to the truss rods 14 and 15. The annular portion of the bracket 16 is preferably provided with a depending border flange 20 which is annular except for the fact that in front where the securing flange 19 is provided on the bracket the border flange 20 extends down the sides of this securing flange 19.

The border flange 20 is gradually increased in width at 21 and gradually curved until at its lower end the securing flange 19 is provided with the oppositely located partially cylindrical tube embracing flanges 22, 23 which form integral extensions of the border flange 20 at its wider portion 21.

The cylindrical tube embracing flanges 22, 23 have their inner cylindrical surfaces 24, 25 shaped to fit on the outside of the cylindrical end portions 26, 27 of the truss tubes 14 and 15 so that the truss tubes fit snugly in these embracing flanges over a portion of the periphery of the truss tubes which is preferably substantially half of the periphery or slightly more than half.

The edges 28, 29 of these tube embracing flanges 22, 23 are located on the under side of the bracket and are spaced from each other by a distance which is sufficient to permit either one of the tubes to be inserted inside the bracket when the bracket is empty or when one tube is already in it, so that the tubes may be inserted from the bottom of the bracket and need not be inserted endwise. This is important because on certain types of bicycles it is not always possible to insert the tubes endwise into the cavity of the truss tube bracket although with the particular construction shown that can also be done when the lower end of each truss tube is entirely free.

The securing flange 19 of the truss bracket 16 is formed with a centrally located through bore 30 adapted to pass the shank 31 of the screw bolt 32 and the bracket is also preferably formed with a downwardly turned intermediate pressed rib 33 below or outwardly of the bolt 32, this rib coming between the two truss rods 14 and 15 as they emerge from the bracket.

The bolt 32 has its shank 31 provided with a threaded portion 34 and the bolt has a non-circular head 35 for use in turning the bolt in threaded engagement with a wedging member 36. The wedging member 36 comprises a metal member of sufficient length to project beyond the bolt 32 a substantial distance above and below the bolt and of sufficient width at its widest portion to be received between the edges 28, 29 of the tube embracing flanges 22, 23.

The wedging member 36 has a threaded through bore 37 for receiving the threaded portion 34 of bolt 32. Its cross-sectional shape is shown in Fig. 3 and it may have an outer convex surface 38 but is provided with a pair of partially cylindrical wedging surfaces 39, 40 for engaging each of the tubes 14 and 15. The inner edge 41 may be plane or curved and the two lateral edges 42, 43 may be plane.

The truss tubes 14 and 15 are shown in section in Fig. 6 and these tubes are formed at their upper ends with an outward bend at 44 so that the extreme upper end portions 45, 46 may extend substantially parallel to each other while the lower portions 47, 48 may diverge after they emerge from the bracket 16. It will be understood that the two truss tubes 14 and 15 diverge from each other in order that they may be secured to the front fork at each of its sides.

In order firmly to secure the parallel portions 45, 46 of the truss tubes in the bracket 16, each truss tube is preferably provided on that side of the tube which is adjacent the bolt 32 with a partially cylindrical groove 49 or 50, the groove being complementary in size and shape to that portion of the bolt shank 31 which each truss rod engages. This groove 49 is preferably formed by a pressing or punching operation and during the formation of such a groove there is an excess of metal at the wall of the groove 49 in the truss tube and this excess of metal must be disposed of in some way. According to the method by means of which I prefer to form the truss tube, the excess metal is punched out to form an aperture at 51 in the middle of the wall of the groove 49.

The partially cylindrical groove 49 may have its wall portions indicated toward the top of the bolt by the numeral 52, and its wall portion toward the bottom of the bolt by the numeral 53. It will thus be observed that the bolt 32 engages those portions 53 of the groove 49 to prevent the truss tubes from being pulled downwardly and the bolt 32 engages those portions 52 of the groove 49 or 50 to prevent the truss tubes from being moved upwardly in the bracket. The bolt is of course held in place in the bracket by its engagement in the bore 30.

In addition to the foregoing shoulders for holding the truss tubes, the wedging member 36 is engaged by the threaded portion 34 of the bolt 32 and drawn into snugly fitting engagement with each truss tube, causing the truss tubes to spread into their proper position engaging the cylindrical surfaces 24, 25 of the tube embracing flanges 22, 23. It should be understood, however, that all of these parts fit quite snugly so that the wedging member 36 merely serves to hold them all in snug engagement with each other, that is, it causes the tubes to have tight engagement with the bracket and the tubes to have tight engagement with the bolt and the wedging member.

Referring to Fig. 7, this is an exploded view of the punch and die which may be used to form the tube which is shown between them. The die 54 may consist of a block of metal such as steel which has a plane stable base 55, the width of which is augmented by the laterally projecting flanges 56, 57. The body of the die may consist of a portion 58 which projects upwardly from the base 55 and is formed with a centrally and longitudinally extending groove 59 of sufficient width to receive a truss tube 14 or 15.

The groove 59 is bounded by the two upwardly extending flange portions 60, 61 and the base of the groove 59 may be substantially half cylindrical as indicated at 62 except that the cylindrical groove portion 62 has two parts which are joined at 63 and which are at an angle to each other, that is, the part 64 extends diagonally upward in the groove 59 and the part 65 extends horizontally. This is for the purpose of bending the truss tube 14 or 15 at the point 44 and forming the parallel end portions 45, 46 on the truss tubes.

At its left end the die preferably includes a stop in the form of a block 66 of metal which is welded or otherwise secured to the body 58 and the block 66 preferably has a short mandrel 67 comprising a short section of rod of cylindrical shape adapted to fit in the end of the truss tube rod to center the truss tube rod and to prevent its being forced out of round at its extreme end portion.

Mandrel 67 may have its inner end formed with a curved partially cylindrical surface 68 corresponding to the under side of the wall portion 52 of groove 49 in the truss rod 14. Of course the mandrel 67 is spaced from the walls of the groove 59 and from the base 65 of the groove sufficiently to permit the truss tube to be inserted around the mandrel 67.

The punch which is indicated in its entirety by the numeral 70 is likewise preferably provided with a wider base portion 71 having a depending body portion 72 the sides 73, 74 of which are parallel and adapted to be slidably received in the groove 59 of the die. The body portion 72 conforms generally to the surfaces of the die 54 when the die has a truss tube 14 as illustrated in Fig. 7 in the groove 59. This means that, generally speaking, there is a partially cylindrical groove 75 extending all the way along the lower edge of the body 72 for engaging the truss tube 14 in the die 54 except that there is an intermediate transverse cylindrical portion 76 on the lower surface of the punch 70 for forming the cylindrical groove 49 in the truss tube 14.

Due to the necessity for disposing of the excess metal of the truss tube that comes into existence when the wall is pressed downwardly to form the cylindrical groove 49, it is also necessary to provide a depending centrally located longitudinally extending rib 77 on the lower surface of the die at this point for forming the slot 51. Thus the die at this point has cylindrical surfaces on each side of the projecting rib 77 and these cylindrical surfaces are indicated again at 76 (Fig. 6).

As the tubes themselves are easily sheared, the rib 77 will punch out a slot at 51 to dispose of the excess metal and when the straight truss tube blank is placed in the die and acted upon by the punch, the truss tube will be simultaneously bent and pressed into the desired shape shown in Fig. 7. Thus it is unnecessary to thread the end of the truss tube as in the devices of the prior art. Yet the truss tube is provided with retaining shoulders having a much greater area of engagement with the single securing bolt that holds the wedging member, truss tubes and bracket together, than could be provided by any threaded structure.

The method of making the truss tubes may be briefly summarized as follows: The truss tube blank is placed in the die in proper position and by means of the punch the tube is simultaneously provided with its bent end portion and has a cylindrical recess formed in the side wall of the tube for engagement with a complementary bolt. At the same time the excess metal of the tube wall at this groove is punched out and upon separating the punch and die the tube is ready for use.

The operation of the truss tube bracket is as follows: The bolt and wedging member having been removed, the bracket may be secured on the head adjusting cup or it may be assembled with the truss tubes apart from the cup. In either event the end portions 45, 46 of the truss tubes are placed in the bracket and the bolt is inserted through the bore in the bracket and through the grooves 49, 50 of the truss tubes. The wedging member is then placed in engagement with the bottom of the truss tubes and the bolt is rotated to draw the wedging member inwardly until it engages the tubes tightly and they engage the bolt and bracket tightly. All of these parts should fit snugly and thus the tubes are firmly secured against longitudinal or lateral movement and they are adapted to resist the tension or compression forces that are exerted on the truss tubes to draw them out of or force them into the bracket.

It will thus be observed that I have invented an improved truss tube bracket by means of which the truss tubes may be bore securely mounted in the bracket than with any of the devices of the prior art with which I am familiar. A single bolt and wedging member serving as a nut not only draws the truss tubes into the bracket but it secures them against longitudinal movement in either direction. The present bracket and tube construction involves only a few stamping operations since the bracket itself may be formed by punching or stamping and the tubes are simultaneously given all of their formations by one operation of a punch and die.

The present construction may be made at a minimum cost and may thus be placed within reach of a large number of purchasers. The construction is simple and sturdy and adapted to be used for a long period of time without necessity for repair or replacement.

The truss tubes are thus adapted to resist the forces which tend to break or bend the front fork more strongly than the devices of the prior art and a very light yet rigid construction is provided for the front fork.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A truss tube bracket assembly comprising a bracket having means for securement to the steering column tube and a pair of truss tubes, said truss tubes having end portions adapted to be received in said bracket and said bracket having tube embracing flanges extending about the outer portions of said truss tubes, and securing means adapted to pass through the bracket and between the truss tubes for drawing the truss tubes into tight engagement with the bracket, said truss tube portions in the bracket being formed with oppositely disposed grooves for receiving said securing means, the said securing means comprising a bolt and a threaded member having tapered surfaces for engaging the truss tubes whereby the truss tubes are wedged apart into tighter engagement with the bracket.

2. A truss tube bracket comprising a metal body formed with a bore for receiving a head adjusting cup, said body having a forwardly and downwardly extending securing flange and said securing flange being bordered by a rearwardly extending reenforcing flange, said reenforcing flange being widened toward the end of said securing flange and formed at its downward extremities with partially cylindrical tube engaging portions.

3. A truss tube bracket for securement to a pair of truss tubes comprising a metal body formed with a bore for receiving a head adjusting cup, said body having a forwardly and downwardly extending securing flange and said securing flange being bordered by a rearwardly extending reenforcing flange, said reenforcing flange being widened toward the end of said securing flange and formed at its downward extremities with partially cylindrical tube engaging portions, said bracket being provided with a through bore in its securing flange, a threaded bolt in said bore, and a threaded nut on said bolt for engaging the truss tubes.

4. A truss tube bracket for securement to a pair of truss tubes comprising a metal body formed with a bore for receiving a head adjusting cup, said body having a forwardly and downwardly extending securing flange and said body being bordered by a downwardly extending reenforcing flange, said reenforcing flange being widened at said securing flange and formed at ist downward extremities with partially cylindrical tube engaging portions, said bracket being provided with a through bore in its securing flange, a threaded bolt in said bore, and a threaded nut on said bolt for engaging the truss tubes, said nut having a pair of partially cylindrical wedging surfaces on its inner side for engaging cylindrical truss tubes.

5. A truss tube bracket comprising a metal body formed with a bore for receiving a head adjusting cup, said body having a forwardly and downwardly extending securing flange and said body being bordered by a downwardly extending reenforcing flange, said reenforcing flange being widened at said securing flange and formed at its downward extremities with partially cylindrical tube engaging portions, said bracket being provided with a through bore in its securing flange, a threaded bolt in said bore, and a threaded nut on said bolt for engaging truss tubes, said nut having a pair of partially cylindrical wedging surfaces on its inner side for engaging cylindrical truss tubes, and a pair of truss tubes fitting in said bracket and engaging said nut, said truss tubes having shoulders for engaging above and below said bolt.

6. A truss tube bracket comprising a metal body formed with a bore for receiving a head adjusting cup, said body having a forwardly and downwardly extending securing flange and said body being bordered by a downwardly extending reenforcing flange, said reenforcing flange being widened at said securing flange and formed at its downward extremities with partially cylindrical tube engaging portions, said bracket being provided with a through bore in its securing flange, a threaded bolt in said bore, and a threaded nut on said bolt for engaging truss tubes, said nut having a pair of partially cylindrical wedging surfaces on its inner side for engaging cylindrical truss tubes, and a pair of truss tubes fitting in said bracket and engaging said nut, said truss tubes having shoulders for engaging above and below said bolt, said shoulders forming parts of the walls of partially cylindrical grooves formed in the adjacent sides of said truss tubes.

7. A truss tube bracket for securing truss tubes to a steering column tube, comprising a sheet metal member formed at one end with a substantially cup-shaped portion for engagement with the head adjusting cup on a steering column tube, said cup-shaped portion having a central bore for passing the steering column tube, and said bracket having a downwardly turned portion provided at each side with a partially cylindrical flange for engaging the upper end of a truss tube, a threaded member passing through the body of said downwardly turned portion adjacent said partially cylindrical side flanges and located between the side flanges, said threaded member being provided on its upper end with a non-circular head and on its lower end with a complementary threaded member having a pair of partially cylindrical inner surfaces for engaging the sides of the truss tubes opposite to the sides which are engaged by the partially cylindrical flanges of the downwardly turned portion, whereby the truss rods may be gripped between said latter threaded member and the partially cylindrical flanges of said downwardly turned portion.

8. A truss tube bracket for securing truss tubes to a steering column tube, comprising a sheet metal member formed at one end with a substantially cup-shaped portion for engagement with the head adjusting cup on a steering column tube, said cup-shaped portion having a central bore for passing the steering column tube, and said bracket having a downwardly turned portion provided at each side with a partially cylindrical flange for engaging the upper end of a truss tube, a threaded member passing through the body of said downwardly turned portion adjacent said partially cylindrical side flanges and located between the side flanges, said threaded member being provided on its upper end with a non-circular head and on its lower end with a complementary threaded member having a pair of partially cylindrical inner surfaces for engaging the sides of the truss tubes opposite to the sides which are engaged by the partially cylindrical flanges of the downwardly turned portion, whereby the truss rods may be gripped between said latter threaded member and the partially cylindrical flanges of said downwardly turned portion, the width of said downwardly turned portion being such with respect to the size of the truss rods that the truss rods overlap the space for the threaded member and the truss rods are provided with partially cylindrical transverse grooves for receiving the first-mentioned threaded member.

9. A truss tube bracket assembly comprising a bracket having means for securement to the steering column tube, and a pair of truss tubes, said truss tubes having end portions adapted to be received in said bracket, and said bracket having tube embracing flanges extending about the outer portions of said truss tubes, and securing means adapted to pass through the bracket and between the truss tubes for drawing the truss tubes into tight engagement with the embracing flanges of the bracket, said truss tube portions in the bracket being formed with oppositely disposed recesses for receiving said securing means, and said securing means comprising a pair of complementarily threaded members, one of which is provided with tapered concavely curved wedging surfaces for engaging and holding the truss tubes, whereby the truss tubes are wedged apart and held in tight engagement with the bracket.

FRANK W. SCHWINN.